Dec. 16, 1958  P. KLAMP  2,864,467
SPEED CHECK DEVICE FOR CONVEYOR SYSTEM
Filed July 9, 1956  2 Sheets-Sheet 1
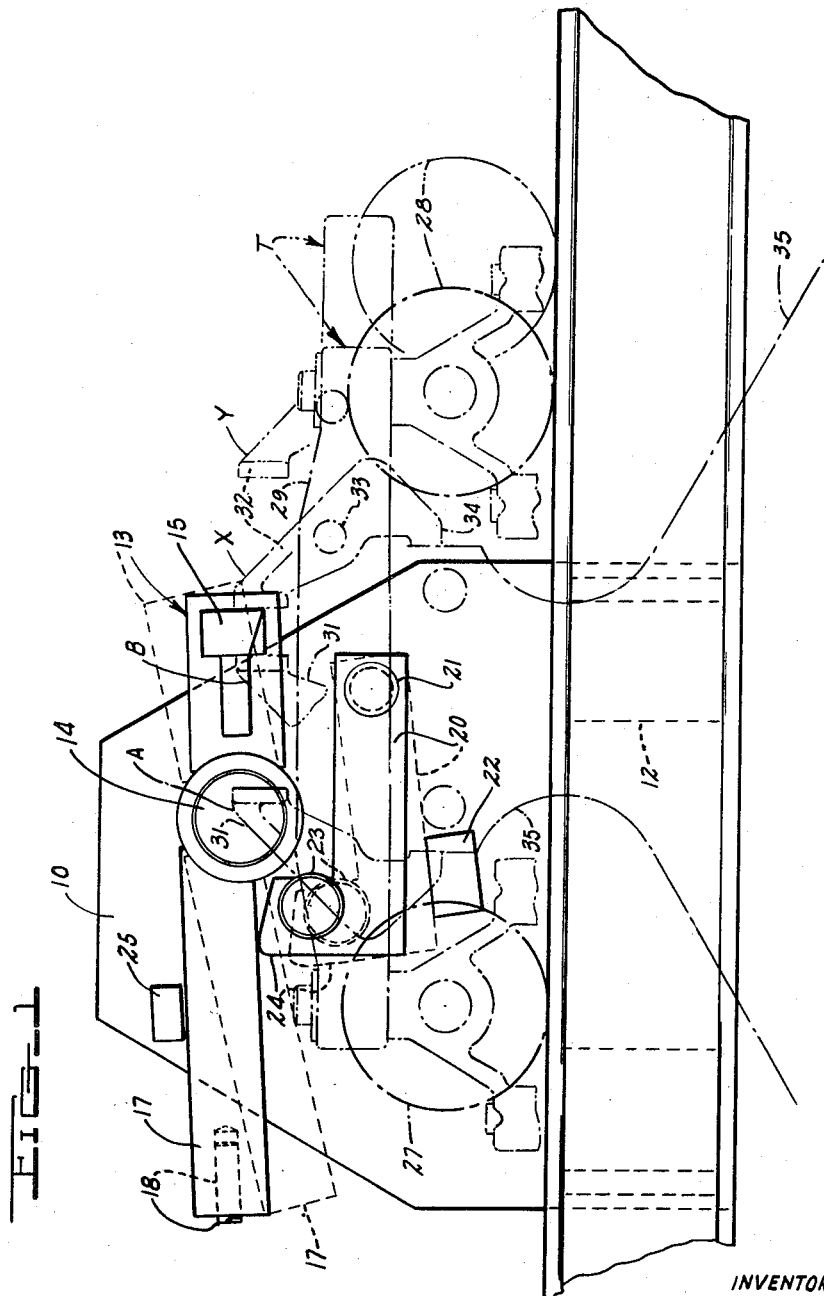
INVENTOR
PAUL KLAMP
BY Whittemore, Hulbert
Belknap
ATTORNEYS Dec. 16, 1958     P. KLAMP     2,864,467
SPEED CHECK DEVICE FOR CONVEYOR SYSTEM
Filed July 9, 1956     2 Sheets—Sheet 2
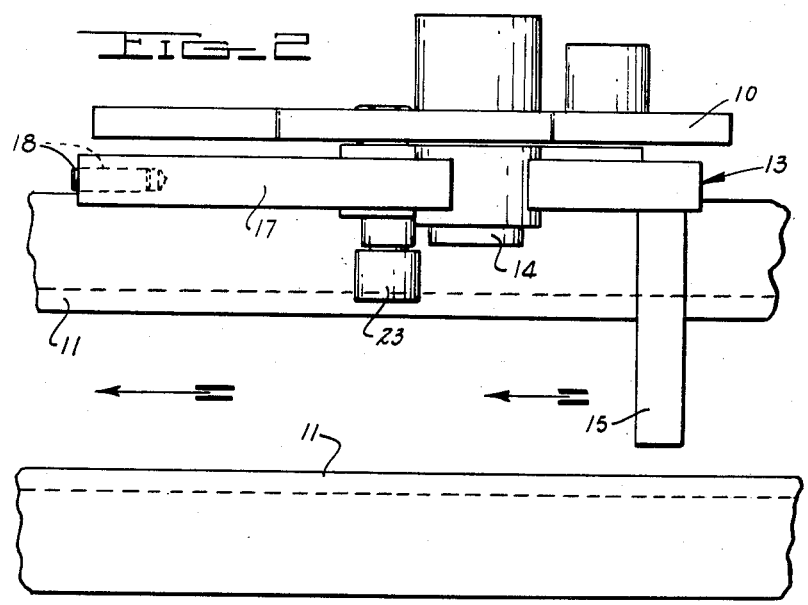
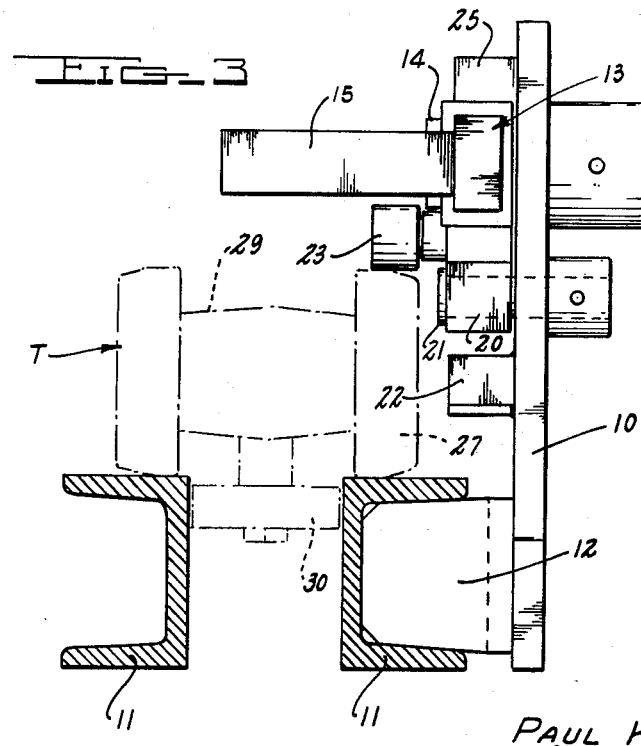
INVENTOR
PAUL KLAMP
BY Whittemore, Hulbert, Belknap
ATTORNEYS

United States Patent Office 2,864,467
Patented Dec. 16, 1958

2,864,467

SPEED CHECK DEVICE FOR CONVEYOR SYSTEM

Paul Klamp, Detroit, Mich., assignor to Mechanical Handling Systems, Inc., Detroit, Mich., a corporation of Michigan Application July 9, 1956, Serial No. 596,471

9 Claims. (Cl. 188—63)

The present invention relates to an improved device of extremely simple construction for checking the speed of travel of a trolley such as is employed in an overhead conveyor system of the type illustrated and described in my copending application, Serial No. 601,001, filed July 30, 1956. Reference may be made to that application for structural details of the trolley in question, however, it is to be understood that the present device has utility in connection with the control of conveyor trolleys or like traveling units which are of specifically different construction than that shown in said application.

It is an object of the invention to provide an improved speed check device or mechanism which is automatically operative to slow down to a desired speed the travel of such a trolley or unit as the latter traverses a slightly inclined conveyor track, which device derives its novel operation from the weight and/or inertia action of the load suspended from or otherwise borne by the trolley.

More specifically, it is an object of the invention to provide a speed check mechanism which includes a bumper member mounted for free pivoting movement in a vertical plane and provided with a bumper element which is interposed between the usual front and rear chain engaging dogs of the trolley upon said swinging movement in one direction. It is a feature of the invention that this member is counterweighted predeterminedly to bias the bumper bar in the opposite rotative direction yet the inertia effect of the trolley load in the direction of travel in which it is halted is sufficient to resist the disengagement of the bumper bar with the dog in question under counterweight action until the direction of the inertia force applied by the load is reversed, causing the trolley dog to, in effect, rebound from the bumper bar.

In accordance with the action thus produced, the time intervals between successive rebounding engagements of the bumper bar with the respective trolley dogs increase as the inertia force is dissipated, and accordingly, the counterweight force on the bumper member is given sufficient time to bias the bumper bar out of its speed checking position between the trolley dogs, the trolley then proceeding forwardly at the desiredly reduced speed.

The foregoing as well as other objects will be made more apparent, as this description proceeds, especially when considered in connection with the accompanying drawings, wherein:

Fig. 1 is a fragmentary view in side elevation of the device of the invention, parts of which are shown in different positions in solid and dotted lines, respectively, in relation to a conventional conveyor trolley, shown in dot-dash line;

Fig. 2 is a fragmentary top plan view of the device; and

Fig. 3 is a view thereof in end elevation, with a conveyor track shown in section and a conveyor trolley roller assembly indicated in dot-dash line.

The speed check mechanism or device of the invention is mounted by means of a rigid, vertically extending plate 10 on the trolley or load bearing track of the conveyor system which, in accordance with the system shown and described in the above entitled application, comprises a pair of rigidly mounted and laterally spaced, horizontal channels 11. A suitable spacer 12 is welded to one of these channels, and the plate 10 is welded to the spacer.

A bumper member, generally designated 13, is mounted by a pivot stud or shaft 14, fixed on and laterally projecting from the support plate 10, to swing freely in a vertical plane paralleling and at one side of the plate, without appreciable frictional drag at the pivot. Bumper member 13 is elongated in character, being provided at a rearwardly facing end thereof with a transversely extending bumper bar 15 which is, as shown in Figs. 2 and 3, of sufficient length to project past the vertical center line between the track members 11.

The opposite, forwardly facing end of the bumper member 13 is in the form of an actuating arm 17, to the extremity of which an appropriate counterweight 18 is applied, as by threadedly inserting a suitable plug in the end of the arm. As will appear, the counter poise force exerted by the counterweight 18 should be nicely chosen, since the operation of the mechanism basically involves this factor.

The plate 10 also serves as a support for an L-shaped control dog 20, which is pivotally mounted on the plate by means of a laterally projecting stud 21 to swing from the dotted line position to the solid line position, and vice versa. A stop lug 22 welded on plate 10 limits the downward motion of the dog.

A dog actuating roll 23 is appropriately journaled on the smaller, vertically extending arm 24 of the dog or cam 20, being in a position in the lower, dotted line position of the dog to be engaged by the trolley of the conveyor, as will be described. The arm 24 upwardly engages the lower side of the counterweighted arm 17 of the bumper member 13, acting to shift the member 13 from the dotted line position to the solid line position of Fig. 1, when the roll 23 is trolley-actuated as mentioned. A fixed stop lug 25 on plate 10 limits the swinging movement of the member 13 in this direction; like the member 13, the control dog 20 is pivoted for free swinging movement without appreciable drag.

The trolley, which is shown in Fig. 1 entirely in dot-dash line, is as described in the application referred to above, hence its component parts need only brief mention. These parts are the forward and rearward track rollers 27, 28, respectively (one of the forward rollers 27 having actuating and controlling engagement with the dog roll 23 referred to above), a trolley frame 29 on which the rollers are mounted, a horizontal guide roller 30 (Fig. 3) traveling between the track members 11, and the forward and rearward or trailing, chain engaging dogs 31, 32, respectively, which are mounted by pivots 33 on the trolley frame 29 and are oppositely urged by their counterweight ends 34 in a direction to oppose approaching movement of the upper ends of the dogs 31, 32 toward one another. The counterweighted lower dog ends 34 are engageable with a load supporting hanger 35 which is mounted on the frame 29 of the trolley in a conventional manner.

In the operation of the speed check device, and prior to the arrival of the trolley T at the device, the counterweighted arm 17 of the bumper member 13 biases the latter counterclockwise about its pivot 14, the arm being in the lowered position shown in dotted line in Fig. 1, and the bumper bar 15 of the member being in a correspondingly elevated position. The cam dog 20 is similarly in a lowered position shown in dotted line, resting on the bottom stop 22, with its roll 23 in the dotted line lowered position, in which the roll is in the path of a forward trolley track roller 27.

As the trolley T approaches from the right and enters the zone of operation of the device, its forward, counter-weighted chain dog 31 passes beneath the elevated bumper bar 15 and the forward trolley track roller 27 engages and passes beneath the roll 23 on the control dog 20, swinging the latter clockwise. This causes the cam nose portion of the dog to elevate the counterweighted arm 17 of the bumper member 13, thus swinging the bumper bar 15 clockwise and downwardly to a position in which it is interposed before the trailing chain dog 32 of the trolley. The parts of the device are shown in this position in solid line in Fig. 1.

When the trolley is moving slowly, the roller 23 drops down again directly after the trolley roller 27 passes underneath, so that it will again be in the dotted line position when roller 27 reaches the position shown in Fig. 1. As a result, arm 24 of dog 20 and bumper member 13, with its bumper bar 15, all have returned to their dotted line positions when dog 32 reaches position X. Now dog 32 passes underneath bumper bar 15 and the trolley continues traveling to the left. Consequently, the trolley is not stopped at all when it passes the speed check device at a low rate of speed.

However, if the speed of the trolley exceeds a certain minimum, the trailing dog 32 reaches the position X shown before the roller 23, dog 20, arm 17 and bumper member 13 with its bumper bar 15 have returned to their dotted line positions. Indeed, if the trolley speed is great, the bumper bar 15 may remain practically in the lowered, dotted line position as so reached by dog 32.

The oncoming trolley dog 32 now strikes the bumper bar, instantaneously halting the trolley, with the forward dog 31 in position A, and the continuing forward inertia force exerted by the forwardly swinging pendent load on the hanger 35 of the trolley maintains the trailing dog 32 in position X against the rear face of the bumper bar until the direction of swing of the load reverses. This is due to the fact that the bumper arm counterweight 18 is unable to overcome the friction between the bar 15 and the dog 32. The reversed swing now pulls the trolley rearwardly, to the right as viewed in Fig. 1, the dog 32 traveling from the position X to the position Y and the leading dog 31 from the position A to the position B, in which it engages the forward face of the bumper bar 15.

When the trolley T, after having been stopped, travels to the right the roller or wheel 27 physically lifts dog roll 23 again, lowering stop bar 15 in a positive fashion before the trolley dog 31 strikes it upon rebound. This makes it impossible for the trolley and load to rebound rearwardly or to the right, out of the zone of operation of the speed check device.

After the dog 31 of the trolley strikes stop bar 15 the trolley again moves to the left, and the cycle of operations described above repeats, assuming that the trolley speed is still greater than the desired minimum. A further repetition ensues if the trolley speed remains above the required minimum after the second cycle, etc., until the speed is sufficiently reduced.

It is seen from the above that the speed to which the trolley is slowed is a function of the duration of the pendulum action of the bumper bar (which in turn is a function of the force biasing the latter counterclockwise) in relation to the time interval of the travel of trolley T from Y to X. The bumper bar pendulum cycle can readily be adjusted by counterpoising the required amount.

It is also evident that, while mention has been made of the inertia effect of a swinging load on the trolley, this factor is not critical. A load rigidly sustained on the trolley will occasion the cycling action described, but with a more abrupt, instantaneous rebound movement in relation to the speed check stop bar.

The bumper bar 15 of the device will then have time to be elevated from between the dogs 31, 32 out of position to be engaged by the rearmost thereof. The trolley now proceeds to the left without restraint.

The invention affords a speed check device of great simplicity and low cost of production yet is unfailing in its action in retarding the speed of advance of trolleys bearing extremely heavy loads. The degree to which the speed is checked is readily controlled by adjusting the position of the counterweight 18 on the arm 17, or by employing counter poise elements of different weight. Needless to say, the principles of the invention are widely adapted in the control of conveyor speeds in many different types of system involving the impositive or gravitational advance of a trolley or like unit, wherein the factor of impetus of the trolley and its load will determine the time in which the trolley engages a stop element or elements of the device, prior to a counter poise or like force taking control.

What I claim as my invention is:

1. A speed check mechanism for a traveling conveyor trolley or like unit having a bumper actuating part and a pair of speed check parts spaced thereon in the direction of travel of the unit, comprising a support and a bumper member mounted on said support for movement adjacent the path of a traveling unit, said bumper member being engageable by said actuating part of said unit to shift the bumper member to a position for contact by one of said speed check parts of said unit to check the forward motion of the latter, said bumper member being normally biased predeterminedly to shift the same out of position to be so contacted in a time interval whose duration is a function of the bias on said bumper member and the speed of said last named part in contacting said bumper member, said member being engageable with the other speed check part of said unit upon reverse rebound of the latter occasioned by making said contact at over a predetermined speed.

2. A speed check mechanism in accordance with claim 1, in which said bumper member is mounted on said support for swinging movement in a vertical plane and said bias is occasioned by a counterweight on said bumper member exerting a predetermined force moment thereon.

3. A speed check mechanism for a traveling conveyor trolley or like unit having a bumper actuating part and a pair of speed check parts spaced thereon in the direction of travel of the unit, comprising a support, and a bumper device carried thereby including a bumper member pivoted on said support for swinging movement in a vertical plane adjacent the forward path of said traveling unit and having a bumper element engageable by one of said speed check parts of said unit in one position of the element to halt travel of the unit, said member being normally biased predeterminedly to urge the said element out of position to be so engaged, and a control member movable on said support and engaged by said actuating part of said unit in the forward travel thereof, said control member acting on said bumper member to shift said bumper element into said position to be engaged by said unit, said bumper member being engageable with the other speed check part of said unit upon reverse rebound of the latter occasioned by engagement of said bumper element by said first speed check part at over a predetermined speed.

4. A speed check mechanism for a traveling conveyor trolley or like unit having a bumper actuating part and a pair of speed check parts spaced thereon in the direction of travel of the unit, comprising a support, and a bumper device carried thereby, including an elongated bumper member medially pivoted on said support for free swinging movement in a vertical plane adjacent the path of forward travel of said unit, said member having a bumper element at one end thereof engageable by one of said speed check parts of said unit in one position of the member to check said travel and being counterweighted at its opposite end to normally bias said bumper element out of position to be so engaged, and a control member freely pivoted on said support and engaged by said actuating part of said unit to shift the control member in the said forward travel of the unit, said control member acting on said bumper member to shift said bumper element into position to be engaged by said unit, said bumper member being engageable with the other speed check part of said unit upon reverse rebound of the latter occasioned by engagement of said bumper element by said first speed check part at over a predetermined speed.

5. A speed check mechanism for retarding the speed of travel of a conveyor trolley or like unit characterized by opposed, forwardly and rearwardly spaced dogs, comprising a bumper member mounted adjacent the path of travel of said unit for swinging movement in a vertical plane, said member having a stop element which is brought between said dogs upon swing of the member in one direction, control means operatively connected to said bumper member and engaged by said traveling unit to swing said bumper member in said direction whereby said stop element may be alternately contacted by said dogs upon rebound, and a counterweight acting on said member to normally bias the same in the opposite direction and out of position between said dogs for engagement of said element by either of said dogs, said counterweight exerting sufficient force on said bumper member to retract said bumper element from between said dogs in a time interval whose duration is determined by the speed of said dogs in contacting and rebounding and the force exerted by said counterweight on said bumper member.

6. A mechanism in accordance with claim 5, in which said bumper member is mounted for said swinging movement with inappreciable friction.

7. A mechanism in accordance with claim 5, in which said control means comprises an element pivoted beneath said bumper member for engagement by said unit, said element acting upwardly on said bumper member in opposition to said counterweight.

8. A mechanism in accordance with claim 5, in which said bumper member is mounted for said swinging movement with inappreciable friction, and in which said control means comprises an element pivoted beneath said bumper member for engagement by said unit, said element acting upwardly on said bumper member in opposition to said counterweight.

9. A speed check mechanism for a traveling trolley or like unit having a pair of speed check parts spaced thereon in the direction of travel of the unit, comprising a support and a bumper member mounted on said support for movement adjacent the path of a traveling unit, said bumper member being engageable by said unit to shift the bumper member to a position to contact one of said speed check parts of said unit to check the forward motion of the latter, said bumper member being normally biased predeterminedly to shift the same out of position to be so contacted in a time interval whose duration is a function of the bias on said bumper member and the speed of said part in contacting said bumper member, said member being engageable with the other speed check part of said unit upon reverse rebound of the latter occasioned by making said contact at over a predetermined speed.

References Cited in the file of this patent

UNITED STATES PATENTS

| 1,594,211 | Nohse | July 27, 1926 |

FOREIGN PATENTS

| 289,020 | Germany | Oct. 25, 1914 |
| 190,926 | Great Britain | Jan. 4, 1923 |